April 24, 1945.                W. G. GERNANDT                2,374,190
                                   ENGINE
                           Filed March 4, 1942            3 Sheets-Sheet 1

INVENTOR
Waldo G. Gernandt.
BY
ATTORNEYS.

April 24, 1945. W. G. GERNANDT 2,374,190
ENGINE
Filed March 4, 1942 3 Sheets-Sheet 2

INVENTOR
Waldo G. Gernandt.
BY
ATTORNEYS.

April 24, 1945.  W. G. GERNANDT  2,374,190
ENGINE
Filed March 4, 1942  3 Sheets-Sheet 3
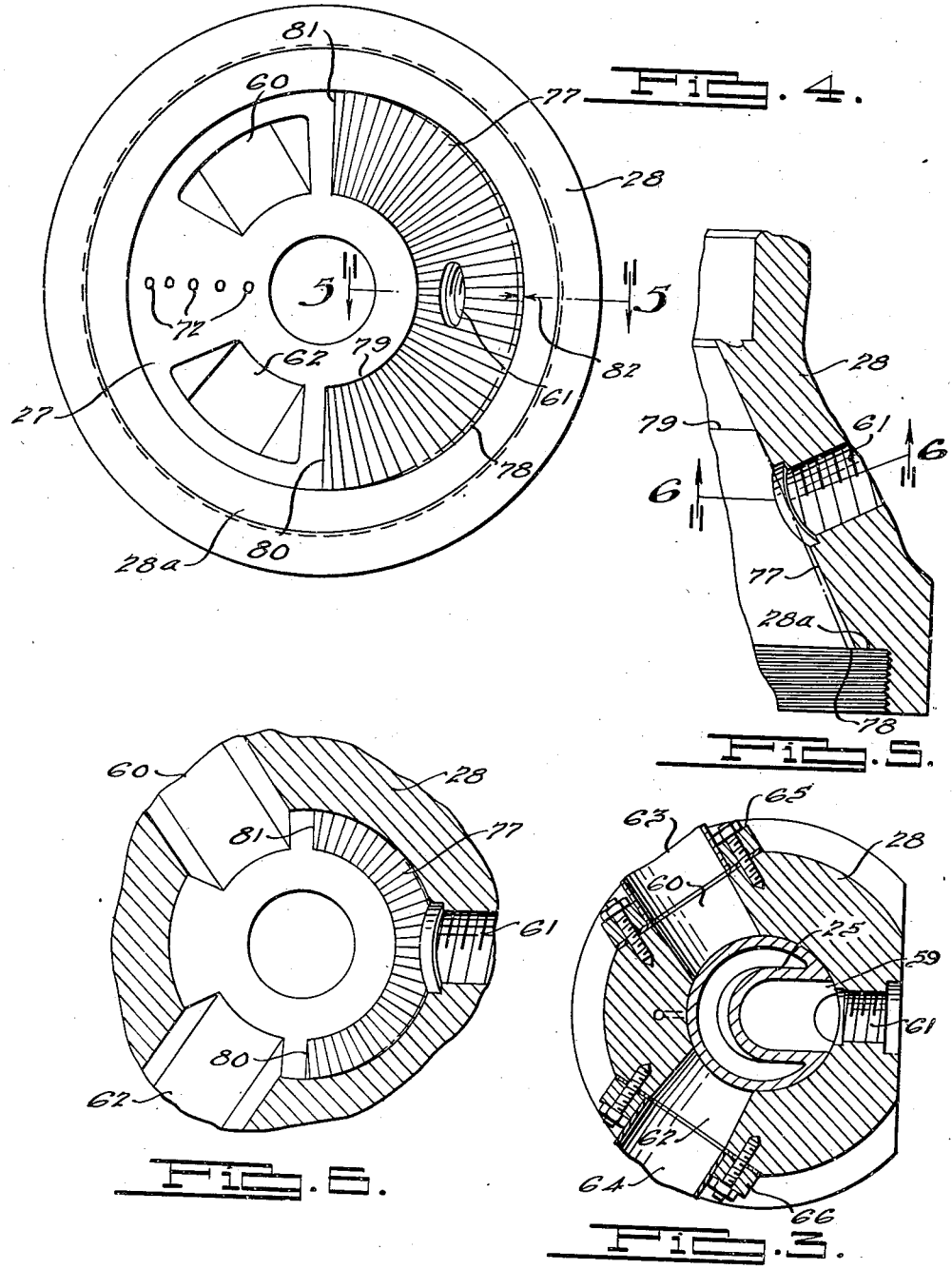
INVENTOR
Waldo G. Gernandt.
BY
ATTORNEYS.

Patented Apr. 24, 1945

2,374,190

UNITED STATES PATENT OFFICE 2,374,190

ENGINE

Waldo G. Gernandt, Detroit, Mich., assignor to Briggs Manufacturing Company, Detroit, Mich., a corporation of Michigan Application March 4, 1942, Serial No. 433,316

13 Claims. (Cl. 123—80)

This invention relates to internal combustion engines. The invention is particularly applicable to engines of the type having a rotatable valve driven in properly timed relation to the engine drive shaft and preferably, although not necessarily, of the kind which rotates continuously in one direction. Also the invention is especially applicable to an internal combustion engine of the foregoing kind in which the rotatable valve or rotor mounted in the cylinder head is formed with substantially all or at least the major portion of the combustion space and is generally conical or frusto-conical in shape. In the preferred embodiment of the invention the combustion chamber in the valve has an opening or port in the side of the valve adapted to communicate with an intake or exhaust passage, or both as the case may be, and also an opening at the inner end or bottom of the valve leading to the cylinder, the combustion chamber otherwise being entirely enclosed or housed within the valve member. The combustible charge within the combustion chamber is fired preferably by spark ignition.

Considerable attempts have been made in the past to produce a satisfactory engine of the above type with the view to increasing the power and efficiency of an internal combustion engine of any given size or piston displacement. In the construction of an engine of this type it is considered desirable that the valve member or rotor be constructed substantially frusto-conical in shape with the combustion chamber closed off from the outer end of the valve, which end is preferably in the form of a stem to which the valve driving and supporting mechanism is operatively connected. Serious difficulties and problems have been encountered in obtaining sustained efficient operation of an engine of commercial size constructed in this manner. The principal problems have had to do with lubrication of the rotary valve, providing adequate and sufficient bearings for the valve in order to prevent seizing, scoring and undue friction during operation, and the sealing of the combustion chamber against leakage of gases and consequent power loss during the power and compression strokes of the piston.

The foregoing problems have been rendered difficult of solution because of variations in pressures or forces acting upon the valve during the engine cycle. One major difficulty has arisen by reason of the effect of the explosion force or pressure in driving the cone-type valve member not only outwardly but also laterally, thereby causing a severe wedging action or thrust of the valve against its seat and tending to seriously impair the oil film between the surfaces of the valve and its bearing seat in the cylinder head, resulting in seizing and scoring of the valve member. Unsuccessful attempts have been made to avoid these disadvantages or difficulties, in order to attain efficient and sustained high speed performance, such as is required for aircraft engines, by resorting to elaborate bearing arrangements and by experimentation with various materials and combinations of materials for the bearing surfaces of the valve within the cylinder head. I have found that the power output of the engine is materially affected by the effectiveness of the seal of the intake and exhaust ports in the cylinder head during the compression and power strokes of the piston, particularly the latter and especially at the time of explosion. Leakage of gases between the surfaces of the valve and head and around these ports will markedly reduce the power output of the engine. Heretofore, where it was attempted to avoid this by fitting the valve quite snugly within its bearing cavity in the head, other difficulties of a serious nature were immediately encountered, such as the impairment of the oil film and consequent seizure of the valve or scoring thereof.

The foregoing disadvantages and difficulties have been largely overcome by virtue of the present invention, an important object whereof being to provide an engine of the foregoing type in which the bearing surface in the cylinder head for the rotor is relieved in such manner as not only to compensate for uneven thermal expansion of the cylinder head but also to permit the rotor to substantially float within its bearing cavity or recess in the cylinder head. As a consequence, it has been possible to obtain sustained performance at high speed for long periods of time without stoppage and without materially impairing the oil film between the juxtaposed surface of the rotor and cylinder head.

A further object of the invention is to provide an improved internal combustion engine of the foregoing type in which considerable of the bearing load is taken at the outer end of the frusto-conical portion of the valve member or rotor and in the area in which this bearing load is taken there is provided a bearing ring interposed between the rotor and the cylinder head.

A further object of the invention is to control more effectively the position of the rotor within the cylinder head and thereby avoid scoring and seizing of the valve, to increase the power output by reducing leakage of gases around the intake and exhaust ports, and to improve the lubrication of the valve while reducing oil consumption.

Still another object of the invention is to simplify the bearing for the valve or rotor within the cylinder head, eliminating complicated thrust bearing arrangements, complicated adjustment devices therefor, reducing weight, saving space, increasing the performance life of the engine, and permitting the use of less expensive metals in the fabrication of the rotor valve and the cylinder head.

Other objects of this invention will appear in the following description and appended claims, reference being had to the accompanying drawings forming a part of this specification wherein like reference characters designate corresponding parts in the several views.

Fig. 3 is a section taken substantially through lines 3—3 of Fig. 1 looking in the direction of the arrows.

Fig. 4 is a bottom plan view of a portion of the cylinder head illustrating particularly the bearing cavity for the rotor or rotary valve.

Fig. 5 is a section taken substantially through lines 5—5 of Fig. 4 looking in the direction of the arrows.

Fig. 6 is a section taken substantially through lines 6—6 of Fig. 5 looking in the direction of the arrows.

Fig. 7 is a view partly in section of the drive gear for the rotor.

Figure 1:
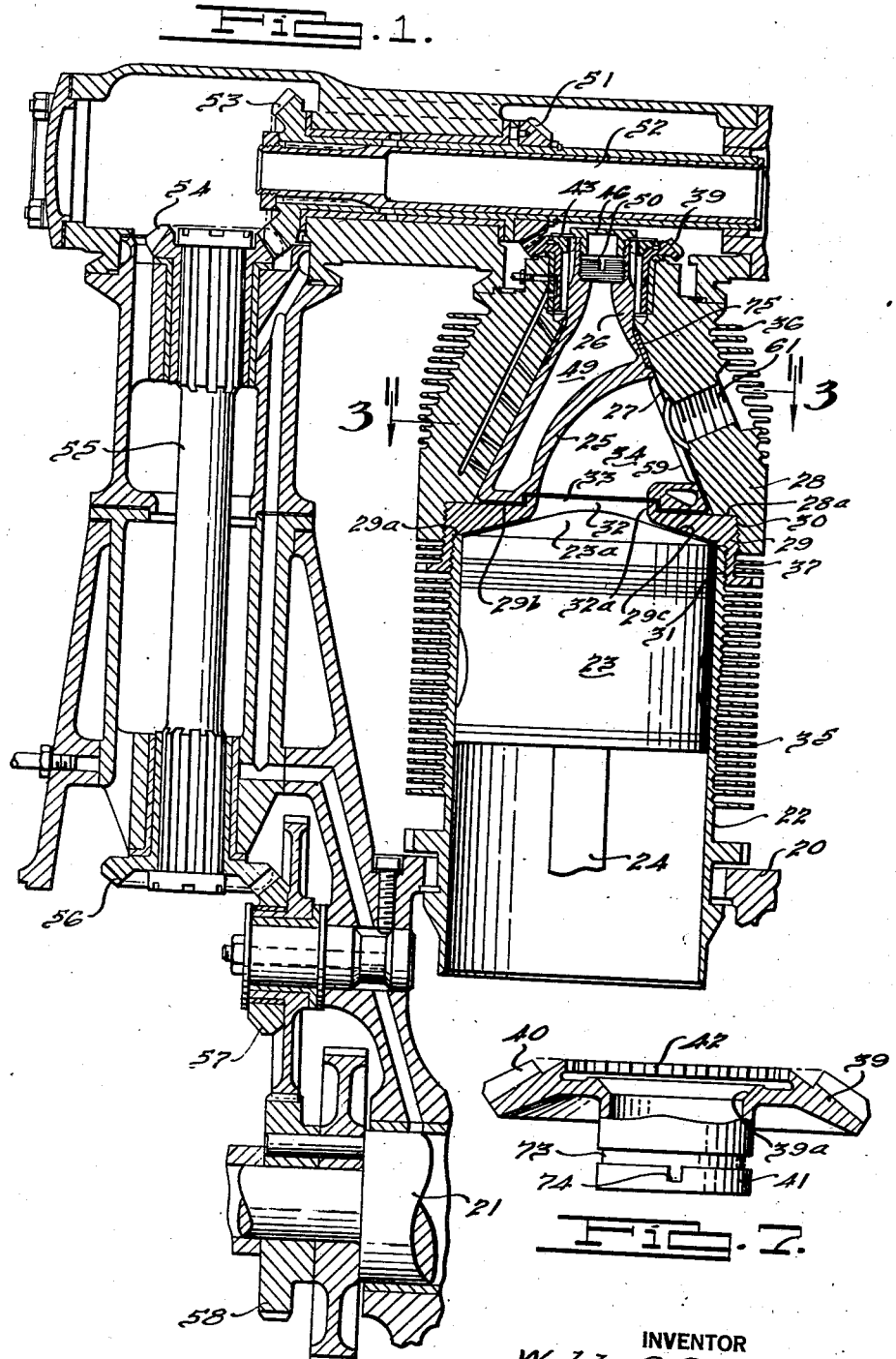
Fig. 1 is a fragmentary sectional elevation illustrating a portion of a multi-cylinder engine embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to an internal combustion engine of the spark ignition type designed particularly for the power plant of an aircraft. The invention may obviously be embodied in engines for other purposes, such as automotive, marine and industrial engines. For most uses the engine is of the multi-cylinder type, although any number of cylinder units may be employed in any given engine. In the present embodiment, for the purposes of simplicity, a single cylinder unit of the engine is illustrated, it being understood that the remaining cylinders of the engine are identical to the structure herein shown and described.

Referring to Fig. 1, the present engine comprises a suitable crankcase 20 within which is mounted a crankshaft 21 supported in bearings according to conventional practice. A cylinder 22 is secured rigidly to the crankcase and has its lower or inner end projecting thereinto. Mounted to reciprocate within the cylinder is a piston 23 adapted to be connected in the usual manner by a connecting rod 24 to the crankshaft 21.

In the present engine the combustion chamber of the cylinder is formed principally within a rotor or rotary member 25, this member comprising a frusto-conical body arranged immediately above the piston when at the top of its stroke and also having a cylindrical stem 26 projecting from the outer end of the rotor body. The rotor 25 fits within a correspondingly shaped substantially frusto-conical cavity 27 in an upper cylinder head member 28. The cylinder head of the engine may be said to comprise two portions or members secured together and to the upper end of the cylinder 22. In addition to the outer member 28 the cylinder head comprises an intermediate member 29 which may herein be termed the rotor mask or shield and forming the pressure control member for the rotor and head and also the throat opening from the cylinder into the combustion chamber.

Figure 2:
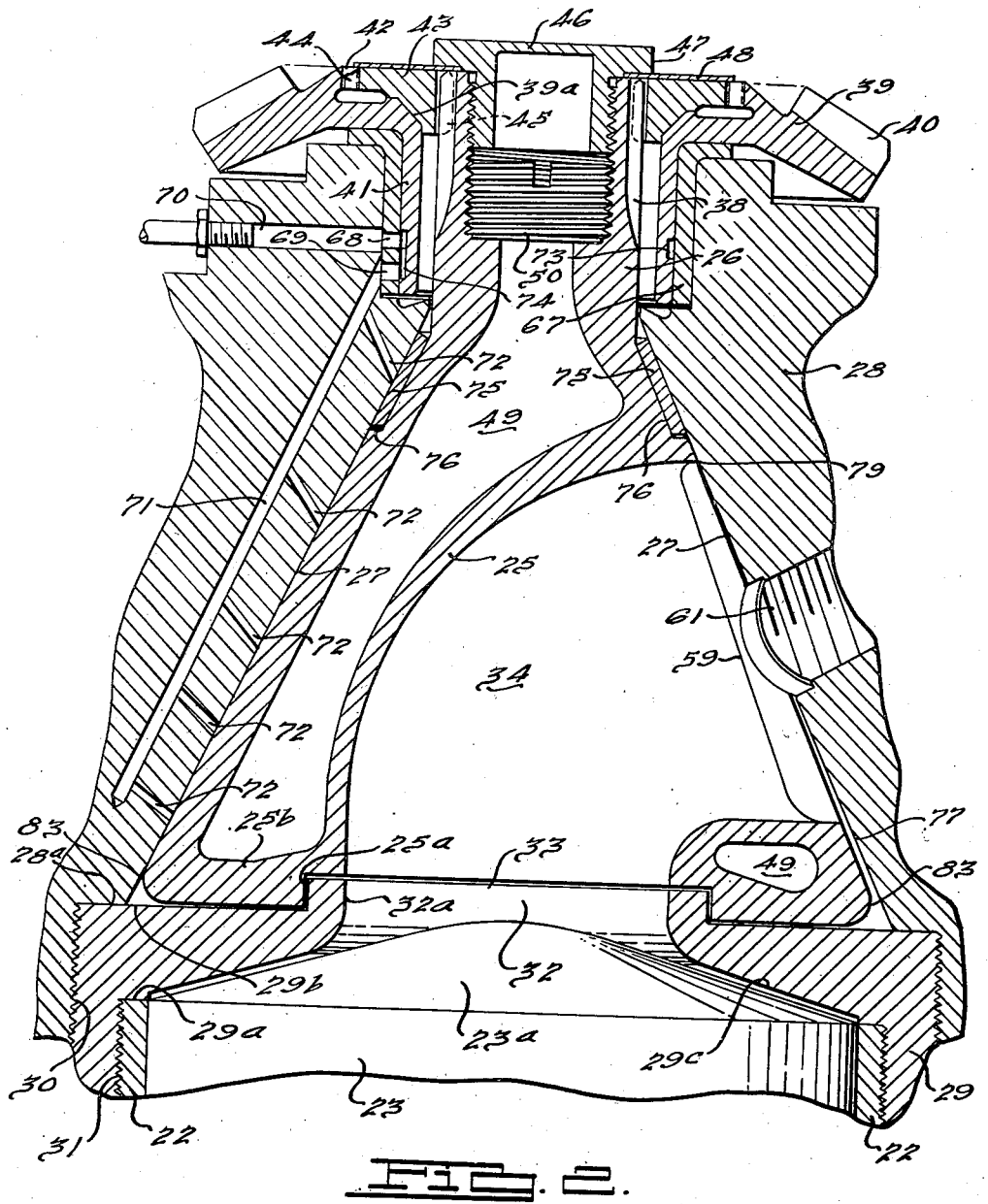
Fig. 2 is an enlarged fragmentary sectional elevation illustrating particularly the associated cylinder head and rotary valve or combustion chamber structure shown in Fig. 1.

The upper or outer end of the cylinder is formed with external threads which are engaged by internal threads on the cylindrical skirt portion of the head member 29 as indicated at 31. The member 29 in turn is provided with external threads which are engaged by internal threads on the cylindrical skirt portion of the outer cylinder head member 28, as indicated at 30. From this construction it will be seen that the cylinder head or mask member 29 may be screwed down tightly over the outer end of the cylinder 22 until the annular shoulder 29a of the member 29 substantially abuts against or engages the upper or outer edge of the cylinder, as shown in Figs. 1 and 2. Also it will be seen that the outer cylinder head member 28 is screwed down tightly over the member 29 until the bottom shoulder 28a of the head 28 substantially engages or abuts against the upper flat ledge or face 29b of the mask member or fire plate 29.

The rotor mask or shield 29 terminates centrally in a projecting annular flange 32 which forms the throat opening 33 into the combustion chamber 34 of the rotor member or rotary valve 25. This rotor is formed at its bottom with an annular recessed portion 25a, the upper surface of which fits smoothly upon the upper flat face of the throat flange 32 and the side wall of which smoothly fits against the outer annular surface of the throat flange 32, there being an operating clearance between the juxtaposed surfaces of the rotor 25 and the plate 29. The lower or inner end 25b of the rotor, which is annular in shape and which terminates in a smooth flat surface, fits snugly into and is confined within the annular recess formed between the outer face of the throat flange 32 and the inner tapered wall of the rotor cavity or chamber 27.

The piston 23 is preferably formed at its outer end with a tapered portion 23a, as illustrated in Fig. 1, which projects into the throat opening 33, thereby reducing the size of the combustion space and preferably confining the combustion chamber substantially to the space within the rotor 25. The piston at the top of its stroke, as shown in Fig. 1, preferably has only a minimum operating clearance with the bottom correspondingly tapered wall of the mask or fire plate 29. The upwardly inclined wall 29c of the mask or fire plate 29 merges into the annular inner wall or surface 32a of the flange 32 forming the throat opening, the surfaces 29c and 32a being joined by a smooth curved surface as shown in the drawings. It will thus be seen that the throat flange 32 provides a restricted passage between the cylinder and the combustion space 34.

The present engine is illustrated as being air cooled and, accordingly, the cylinder 22 is provided with projecting fins 35. Cooling fins 36 and 37 are also provided on the cylinder head members 28 and 29, respectively. It will be understood that the present invention is not limited to an air cooled engine as it will be apparent that any effective cooling system may be utilized.

The rotor 25 is driven through the medium of the stem 26 which is positively connected to a driving gear in such manner as to permit slight relative axial and radial movement between the driving gear and the rotor. The stem 26 of the rotor is provided with external longitudinal splines 38 and is also provided with internal threads within the cylindrical bore thereof. The rotor is driven by a gear 39 having suitable gear teeth 40, this gear being formed with a depending cylindrical hub or sleeve 41 having a sliding fit over the stem 26. The gear 41 also has internal tooth-like splines 42. A coupling member 43 fits within the annular space formed between the teeth 42 of the driving gear 39, this coupling member having exterior teeth or splines 44 fitting into the spaces between the splines 42 of the driving gear and also having internal splines 45 fitting within the spaces formed by the splines 38 of the stem 26. The coupling member 43 has an annular tapered surface engageable with a correspondingly shaped tapered surface 39a of the gear 39. 46 is a clamping nut having external threads engageable with the threads of the valve stem 26 and having an outwardly projecting hex formed flange 47. Interposed between this flange and the end of the stem 26 is a spring washer 48 having a central aperture through which the clamping nut projects, the washer being of a sufficient diameter to engage the upper face of the gear 39, as shown in Fig. 2.

The rotor body 25 is cored entirely around the combustion chamber 34 to provide a cavity 49 which is closed at the upper end of the valve by means of a screw plug 50 screwed tightly into the threaded portion of the valve stem 26 below the clamping nut 46. Any suitable heat transfer or conducting medium, such as metallic sodium, is introduced into the cavity 49 through the hollow stem 26, and sealed therein by the screw plug 50.

Referring to Fig. 1, the gear 39, which is attached to the projecting stem of the rotor 25, is driven through the medium of a gear 51 attached to a top horizontal shaft 52. This shaft is of the desired length to permit simultaneous driving of the rotors of a plurality of cylinders arranged in line. Attached to the end of the shaft 52 is a gear 53 which is driven by a gear 54 secured to the upper end of a tower shaft 55. This shaft is suitably housed and has secured to the lower end thereof a gear 56 which is driven through the medium of suitable gearing 57 from a gear 58 attached to the crankshaft 21.

It will be seen that in the particular embodiment herein illustrated the rotor or valve 25 has a single port 59 in its side communicating with the combustion chamber 34 adapted to register in succession with an intake port 60, a spark plug at location 61, and an exhaust port 62. In this embodiment, therefore, the valve or rotor 25 is driven at one-half engine or crankshaft speed. The driving mechanism, above described and shown in the drawings, is illustrative of a suitable mechanism by which one or a plurality of rotary valves for a corresponding plurality of cylinders may be driven from the crankshaft.

The spark plug location 61 is in the form of a tapped hole for the reception of a spark plug of any suitable type. The intake and exhaust ports or passages 60 and 62, formed in the cylinder head 28, open into the frusto-conical cavity 27 of the cylinder head and at these points the passages 60 and 62 are shaped in the manner illustrated in Fig. 4. The inlet passage 60 communicates with an intake conduit 63 and the outlet passage 62 communicates with an exhaust conduit 64, these conduits being coupled to the cylinder head body 28 in any suitable manner such as through the medium of clamping rings and bolts 65 and 66, respectively.

The present engine preferably utilizes a fuel injection system instead of a carburetor, although it will be understood that the invention is not so limited. Fuel is preferably supplied to the air stream directed through the inlet passages 63, 60 into the combustion chamber when the port 59 in the rotor 25 registers with the port or passage 60. Fuel may be injected through the medium of any suitable fuel injector (not shown) so that the rotor will be supplied with the proper combustible mixture at the time of ignition, namely when the port 59 registers with the spark plug at location 61. It will be understood that suitable lubricating means is provided for the rotor 25 and also for the operating parts of the engine so as to maintain an oil film between all surfaces requiring lubrication. Such lubricating means in part may be similar to that shown and described in the patent to Isley, 2,305,874, December 22, 1942.

The frusto-conical cavity 27 in the cylinder head 28 terminates at its upper end in a cylindrical counterbore within which is press fitted a sleeve or bushing 67. The sleeve or hub portion 41 of gear 39 rotates within the bushing 67. The bushing 67 at one side thereof is provided with vertically spaced radially extending holes or ports 68 and 69. The upper hole or port 68 registers with and is constantly in communication with a transverse drilled hole 70 in the upper end of the cylinder head. Lubricating oil is supplied under constant pressure to the passage or conduit 70 through the medium of any suitable oil pump system. The lower hole or port 69 registers with and is constantly in communication with the upper end of a drilled hole 71. Leading from the passage 71 to the tapered wall of the cavity 27 and hence to the space between the adjacent walls of the rotor 25 and the cavity or recess 27 are relatively narrow or small ducts or passages 72. The sleeve 41 of the gear 39 is provided with an annular groove or channel 73 (see Fig. 7) which registers and is in constant communication with the port 68 and hence with the oil inlet conduit 70. At one point in the annular groove or channel 73 there is provided a communicating groove or notch 74 which extends downwardly from the channel 73. This groove or notch 74 is adapted to register at each revolution of the gear 39 and hence at each revolution of the rotor 25 with the port 69 leading into the communicating oil passage 71. Thus, it will be seen that at each revolution of the driving gear 39 and of the rotor 25 the oil inlet passage 70 will be placed in direct communication with the oil distributing passage 71 through the medium of the oil ports 68 and 69 and oil passage 74 which bridges the space between these ports. In this manner the oil delivered to the valve for lubricating it is metered and as a consequence more efficient control of the oil consumption is achieved.

It will be noted that the distributing passage 71 and ducts 72 are located in the cylinder head opposite the spark plug location. At the time of firing the charge in the combustion chamber 34 the explosion pressure tends to shift the valve laterally toward the opposite wall of the cavity 27 and also outwardly. Due to this shifting of the valve under the force of the explosion it is desirable that an adequate oil film be provided at the locality of greatest pressure of the valve against the wall of the cylinder head. In the present engine it is preferred that the passage 71 connect the ports 68 and 69 at or just prior to ignition so that the shift of the valve under the explosion pressure will be against a body of oil already forced and being forced between the juxtaposed surfaces of the valve and head, which oil will be squeezed out between the surfaces to produce and maintain an unbroken oil film which not only prevent scoring but also assists in sealing the ports 60 and 62 against gas leakage and consequent loss of power.

Interposed between the upper end of the tapered wall of the valve or rotor 25 and the correspondingly tapered wall of the cylinder head cavity 27 is a rotatable thrust bearing ring 75 formed of a suitable material such as bronze or lead bronze alloy. The rotor is formed with an annularly extending recess 76 to receive the frusto-conical ring 75 which is a free floating bearing between the rotor and cylinder head. In the present embodiment of the invention the upper edge of the bearing ring terminates substantially at the lower edge of the outer cylindrical surface of the rotor stem 26 and the recess is formed so that the outer surface of the bearing ring is flush with the outer surface of the rotor 25. The width of the bearing ring 75 is such that its lower edge is located a suitable distance above the upper edges of the ports 60 and 62 and similarly above the port 59. Since the ring 75 is free from positive connection with the rotor and the cylinder head, and therefore substantially floats therebetween, it will be seen that the ring will have rotational movement imparted to it during rotation of the rotor. Normally the ring 75 will turn at half the speed of the rotor. A very efficient and long-lived bearing is thus provided.

The frusto-conical cavity 27 in the cylinder head, which normally has a shape complementary to the shape of the rotor 25, is in the present instance relieved at one side in order to afford a certain freedom of movement of the rotary valve within the bearing cavity, resulting in important advantages in operation as hereinafter pointed out. In accordance with the present embodiment of the invention metal is removed from the wall of the bearing cavity 27 at the side thereof opposite the ports 60 and 62 to provide a relieved area indicated at 77. Referring particularly to Figs. 2, 4 and 5, it will be seen that this relief varies in depth from its upper end toward the bottom of the valve. As illustrated, the relieved area 77 commences at a line 79 just below the bearing ring 75 at or near the upper edge of the port 59 and extends to the mask plate 29 as indicated by line 78. The relieved area thus extends between the curved lines 79 and 78, at line 79 the relief being substantially zero in depth and at 78 the relief being maximum in depth. As shown in Fig. 4 the relieved area 77 extends substantially halfway around the bearing cavity 27 in the cylinder head, terminating at one end at 80 adjacent the exhaust port 62 and at its opposite end at 81 adjacent the inlet port 60. At points 80 and 81, spaced from the exhaust and inlet ports 62 and 60, respectively, the relief 77 is substantially zero and from these points increases in depth to point 82 opposite the center of the spark plug opening 61. From this construction it will be seen that this relieved area 77 tapers in depth in two directions, namely in the direction of the height of the valve and also in a circumferential direction. The relief has its maximum depth at the bottom of the cavity 27 at point 82 in line with the center of the spark plug hole 61. From this point the relief diminishes in depth upwardly until it becomes zero at curved line 79. Also the relieved area diminishes in depth circumferentially in both directions from point 82 until it reaches zero at lines 80 and 81. In the drawings the amount of the relief 77 is shown somewhat exaggerated for the purposes of clearness. In preferred practice this relief at the point of greatest depth will range from approximately four to eight thousandths of an inch in depth over and above normal operating clearances. Normally an operating clearance of approximately one to two thousandths of an inch is provided between the rotor and the cavity 27 and fifteen thousandths of an inch between the bottom of the rotor and the plate 29. The amount of the relief will, of course, depend to some extent upon the relative expansion rates of the cone 25 and the cylinder head.

By providing the relief 77 it will be seen that the cone or rotor 25 is at all times maintained free within the bearing cavity 27 regardless of thermal expansion of the metal of the parts. Thus, at the time of the explosion when a force exists tending to thrust the rotor 25 outwardly, this thrust will largely be taken at the bearing 75. Since the bearing pressure of the cone below the ring 75 is slightly relieved by reason of the area 77, it will be apparent that during the power stroke and also the compression stroke the unit pressure at the unrelieved areas around the ports 60 and 62 in the cavity 27 will be increased thereby improving the seal around these ports against leakage of gases and consequent loss in power. Hence, one of the advantages of the provision of the relieved area 77 is to improve the sealing of the ports 60 and 62 during power and compression strokes while at the same time freeing the valve sufficiently to prevent sticking or scoring. The relief is greatest at the bottom of the valve owing to the fact that the relative expansion of the head and cone is greatest at this point, and the amount of the relief is calculated so that the valve at all times will have a running fit and will be permitted a slight degree of lateral and outward displacement in order to effectively seal the ports 60 and 62 and also to concentrate most of the outward thrust against the bearing ring 75.

The use of the floating bearing ring 75 has the further advantage of permitting substantial savings in the cost of metals used for manufacturing the head and the valve 25. By virtue of this construction it is possible to use cast iron in the head instead of aluminum as heretofore and also to use inexpensive steel in the manufacture of the cone 25.

I claim:
1. An internal combustion engine comprising a cylinder having a reciprocable piston therein, a rotatable frusto-conical valve associated with the cylinder and including therein a substantial portion of the combustion space, and a fixed body having a frusto-conical bearing cavity for said valve, a portion of the wall of said cavity having a relieved area of varying depth.

2. An internal combustion engine comprising a cylinder having a reciprocable piston therein, a rotatable frusto-conical valve associated with the cylinder and including therein a substantial portion of the combustion space, and a fixed body having a frusto-conical bearing cavity for said valve, a portion of the wall of said cavity having a relieved area of varying depth from one end toward the other end of the valve.

3. An internal combustion engine comprising a cylinder having a reciprocable piston therein, a rotatable frusto-conical valve associated with the cylinder and including therein a substantial portion of the combustion space, and a fixed body having a frusto-conical bearing cavity for said valve, a portion of the wall of said cavity having a relieved area of varying depth circumferentially of the valve.

4. An internal combustion engine comprising a cylinder having a reciprocable piston therein, a rotatable frusto-conical valve associated with the cylinder and including therein a substantial portion of the combustion space, a fixed body having a frusto-conical bearing cavity for said valve, adjacently located intake and exhaust ports in said cavity, the wall of said cavity opposite said ports having a relieved area.

5. An internal combustion engine comprising a cylinder having a reciprocable piston therein, a rotatable frusto-conical valve associated with the cylinder and including therein a substantial portion of the combustion space, a fixed body having a frusto-conical bearing cavity for said valve, adjacently located intake and exhaust ports in said cavity, the wall of said cavity opposite said ports having a relieved area terminating short of said ports.

6. An internal combustion engine comprising a cylinder having a reciprocable piston therein, a rotatable frusto-conical valve associated with the cylinder and including therein a substantial portion of the combustion space, a fixed body having a frusto-conical bearing cavity for said valve, adjacently located intake and exhaust ports in said cavity, the wall of said cavity opposite said ports having a relieved area terminating short of said ports and of varying depth from one end of the area to the other.

7. An internal combustion engine comprising a cylinder having a reciprocable piston therein, a rotatable frusto-conical valve associated with the cylinder and including therein a substantial portion of the combustion space, a fixed body having a frusto-conical bearing cavity for said valve, adjacently located intake and exhaust ports in said cavity, the wall of said cavity opposite said ports having a relieved area of increasing depth from the narrower end of the valve toward the wider end.

8. An internal combustion engine comprising a cylinder having a reciprocable piston therein, a rotatable frusto-conical valve associated with the cylinder and including therein a substantial portion of the combustion space, a fixed body having a frusto-conical bearing cavity for said valve, a portion of the wall of said cavity having a relieved area, and a bearing ring interposed between said valve and the wall of the cavity and spaced from said relieved area.

9. An internal combustion engine comprising a cylinder having a reciprocable piston therein, a rotatable frusto-conical valve associated with the cylinder and including therein a substantial portion of the combustion space, a fixed body having a frusto-conical bearing cavity for said valve, a portion of the wall of said cavity having a relieved area, and a bearing ring interposed between said valve and the wall of the cavity adjacent the narrower end of the valve and spaced from said relieved area.

10. An internal combustion engine comprising a cylinder having a reciprocable piston therein, a rotatable frusto-conical valve associated with the cylinder and including therein a substantial portion of the combustion space, a fixed body having a frusto-conical bearing cavity for said valve, a portion of the wall of said cavity having a relieved area, and a bearing ring interposed between said valve and the wall of the cavity adjacent the narrower end of the valve and spaced from said relieved area, said relieved area increasing in depth from the said narrower end of the valve toward the wider end.

11. An internal combustion engine comprising a cylinder having a reciprocable piston therein, a rotatable generally frusto-conical valve associated with the cylinder and including therein a substantial portion of the combustion space, said valve having a side port communicating with said space, and a fixed body having a generally frusto-conical bearing cavity for said valve, there being a relieved area between a portion of the wall of said cavity and the valve terminating proximate to the upper edge of said port.

12. An internal combustion engine comprising a cylinder having a reciprocable piston therein, a rotatable frusto-conical valve associated with the cylinder and including therein a substantial portion of the combustion space, and a fixed body having a frusto-conical bearing cavity for said valve, there being a relieved area of varying depth between a portion of the wall of said cavity and said valve.

13. An internal combustion engine comprising a cylinder having a reciprocable piston therein, a rotatable frusto-conical valve associated with the cylinder and including therein a substantial portion of the combustion space, and a fixed body having a frusto-conical bearing cavity for said valve, said valve having a side port communicating with said space and a bearing in said cavity above said port, there being a relieved area between said valve and the wall of the cavity immediately below said bearing in the height of said port.

WALDO G. GERNANDT.